United States Patent
Rulfi Fertilio

(10) Patent No.: US 10,830,288 B2
(45) Date of Patent: Nov. 10, 2020

(54) SYNCHRONIZER FOR A MECHANICAL TRANSMISSION, PARTICULARLY FOR A TRANSMISSION OF A VEHICLE

(71) Applicant: Dana Graziano S.r.l., Rivoli (IT)

(72) Inventor: Emanuele Rulfi Fertilio, Mondoví (IT)

(73) Assignee: Dana Graziano S.r.l., Rivoli (IT)

( * ) Notice: Subject to any disclaimer, the term of this patent is extended or adjusted under 35 U.S.C. 154(b) by 25 days.

(21) Appl. No.: 16/455,210

(22) Filed: Jun. 27, 2019

(65) Prior Publication Data

US 2020/0011383 A1   Jan. 9, 2020

(51) Int. Cl.
*F16D 23/06* (2006.01)

(52) U.S. Cl.
CPC .......... *F16D 23/06* (2013.01); *F16D 23/0612* (2013.01)

(58) Field of Classification Search
CPC .............................. F16D 23/06; F16D 23/0612
See application file for complete search history.

(56) References Cited

U.S. PATENT DOCUMENTS

| | | | |
|---|---|---|---|
| 3,270,843 A * | 9/1966 | Ivanchich | F16D 23/06 192/53.341 |
| 3,612,235 A * | 10/1971 | Ashauer | F16D 23/06 192/53.34 |
| 5,269,400 A | 12/1993 | Fogelberg | |
| 5,531,305 A * | 7/1996 | Roberts | F16D 23/06 192/53.332 |
| 5,560,461 A * | 10/1996 | Loeffler | F16D 23/06 192/53.32 |

FOREIGN PATENT DOCUMENTS

| | | |
|---|---|---|
| DE | 1475333 A1 | 11/1969 |
| DE | 102013105622 A1 | 12/2014 |
| EP | 0652385 A2 | 5/1995 |
| EP | 0756098 A1 | 1/1997 |

OTHER PUBLICATIONS

Italian Patent Trademark Office, Search Report with written opinion in Application No. IT102018000006989, dated Mar. 25, 2019, 8 pages.

* cited by examiner

*Primary Examiner* — David R Morris
(74) *Attorney, Agent, or Firm* — Marshall & Melhorn, LLC

(57) ABSTRACT

A synchronizer may have a hub, an engagement sleeve, a pair of engagement ring gears, a pair of synchronizing rings and a pre-synchronizing system interposed between the hub and the engagement sleeve. The pre-synchronizing system may have a single elastic ring which is axially interposed between the synchronizing rings, is drivingly connected with the engagement sleeve in the axial sliding movement relative to the hub and is at least partially received in an internal annular groove of the engagement sleeve.

5 Claims, 5 Drawing Sheets

SYNCHRONIZER FOR A MECHANICAL TRANSMISSION, PARTICULARLY FOR A TRANSMISSION OF A VEHICLE

BACKGROUND OF THE INVENTION

The present invention generally refers to a synchronizer for a mechanical transmission, such as for example a transmission of a vehicle, designed to torsionally connect a shaft of the transmission selectively with either one of a pair of gear wheels idly mounted on that shaft.

More specifically, the present invention relates to a synchronizer provided with a pre-synchronizing system.

A synchronizer of the above-specified type is known from DE 14 75 333 A1.

According to this known solution, the synchronizer comprises:

- a hub arranged to be torsionally connected to a shaft of the transmission,
- an engagement sleeve which is slidable in the axial direction, that is to say, parallel to the axis of rotation of the shaft,
- a pair of synchronizing rings, each of which is associated to a respective gear wheel and has, on its radially outer side, respective outer teeth arranged to mesh with inner teeth of the engagement sleeve and, on its radially inner side, a friction surface (in particular a conical surface) arranged to be brought into engagement with a corresponding friction surface of the respective gear wheel to allow generation of a friction torque between the synchronizing ring and the gear wheel, and
- a pre-synchronizing system comprising a single elastic ring, which is axially interposed between the synchronizing rings, is drivingly connected with the engagement sleeve in the axial sliding movement relative to the hub and is at least partially received in an internal annular groove of the engagement sleeve.

SUMMARY OF THE INVENTION

It is an object of the present invention to provide an improved synchronizer for a mechanical transmission with respect to the above-identified prior art.

This and other objects are fully achieved according to the invention by virtue of a synchronizer for a mechanical transmission of the above-specified type, characterized in that each synchronizing ring integrally forms a plurality of tabs which extend axially inwards from the respective outer teeth and are angularly evenly spaced from each other, the plurality of tabs of each synchronizing ring being configured to allow the elastic ring to axially slide on said tabs when the engagement sleeve is moved from the neutral position to either of the engagement positions. Such a configuration allows to reduce the overall number of components of the synchronizer, as the tabs are made in one piece with the respective synchronizing ring.

According to an embodiment, the engagement sleeve has a substantially U-shaped cross-section, with an external annular groove in an axially middle region thereof, said external annular groove being intended to be engaged by a control member to cause axial movement of the engagement sleeve in either direction.

According to an alternative embodiment, the engagement sleeve has a substantially T-shaped cross-section, with a larger thickness (i.e. a larger radial size) in its axially middle region, i.e. in the region of the aforementioned internal annular groove.

BRIEF DESCRIPTION OF THE DRAWINGS

Further features and advantages of the present invention will become more apparent form the following detailed description, given purely by way of non-limiting example with reference to the appended drawings, where.

DETAILED DESCRIPTION OF EMBODIMENTS OF THE INVENTION

Figure 1:
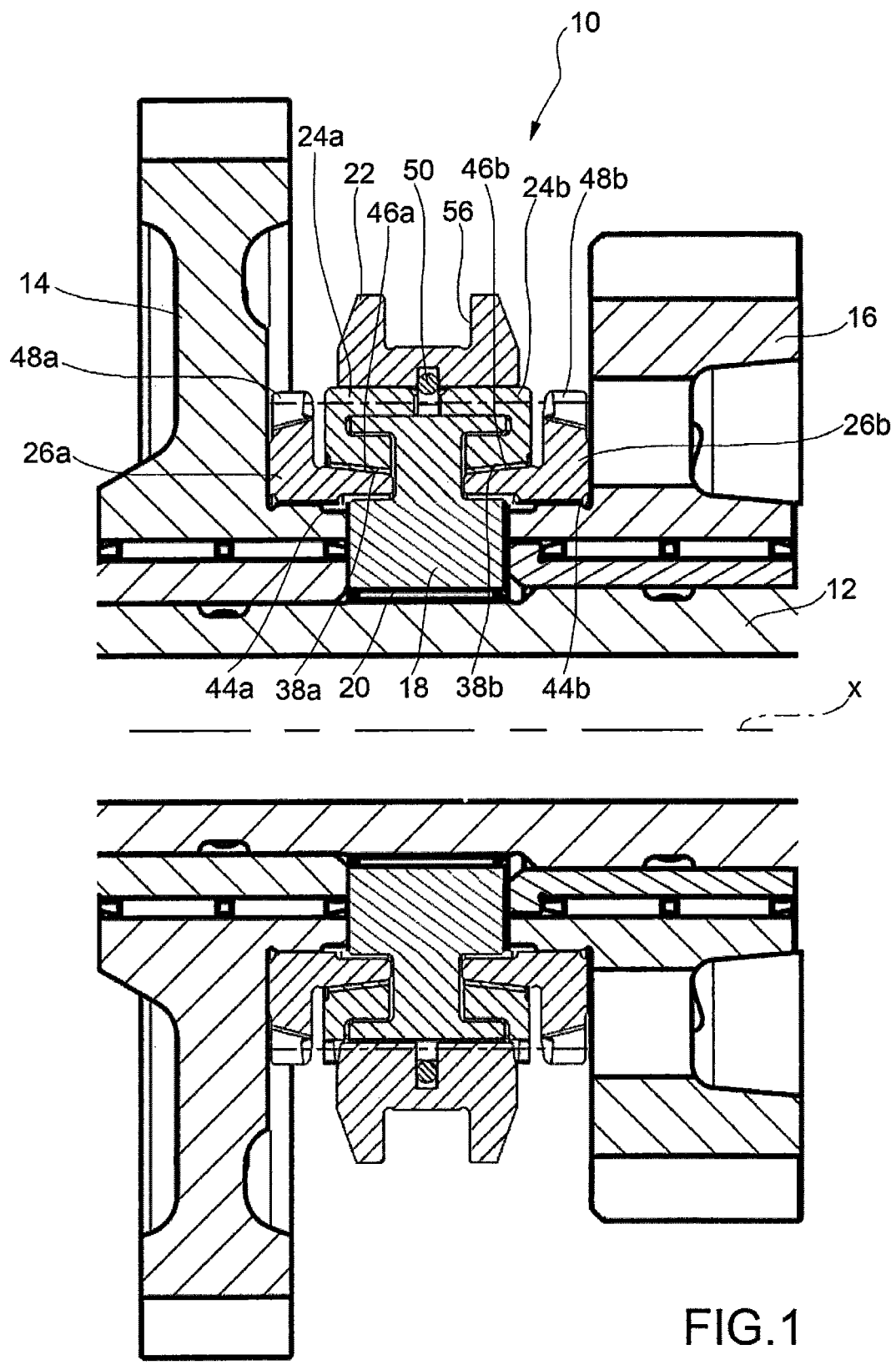
FIG. 1 is a section view of a synchronizer for a mechanical transmission according to an embodiment of the present invention, in the neutral position.
Figure 1A:
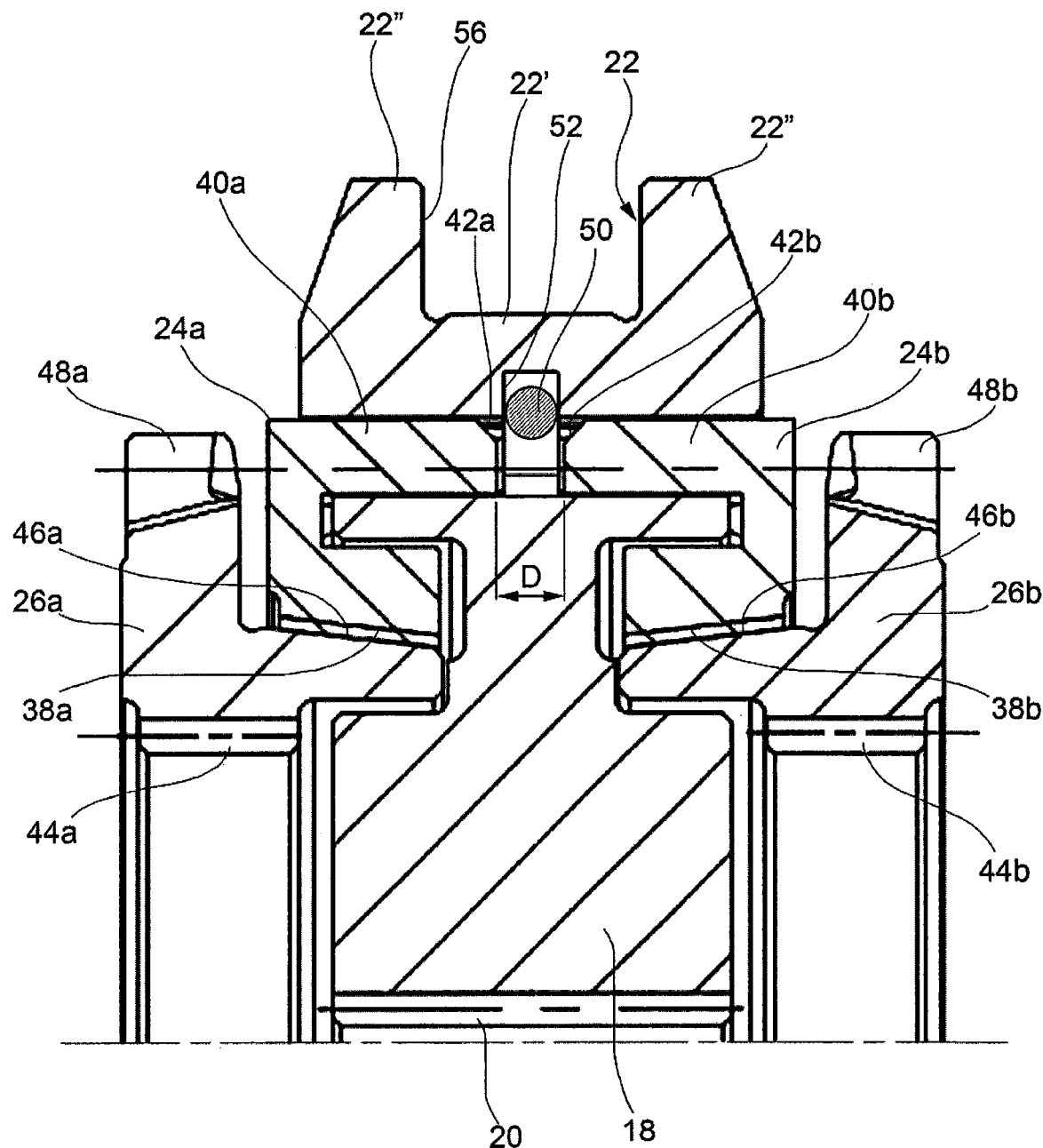
FIG. 1a is an enlarged scale view of a portion of the synchronizer of FIG. 1.
Figure 2:
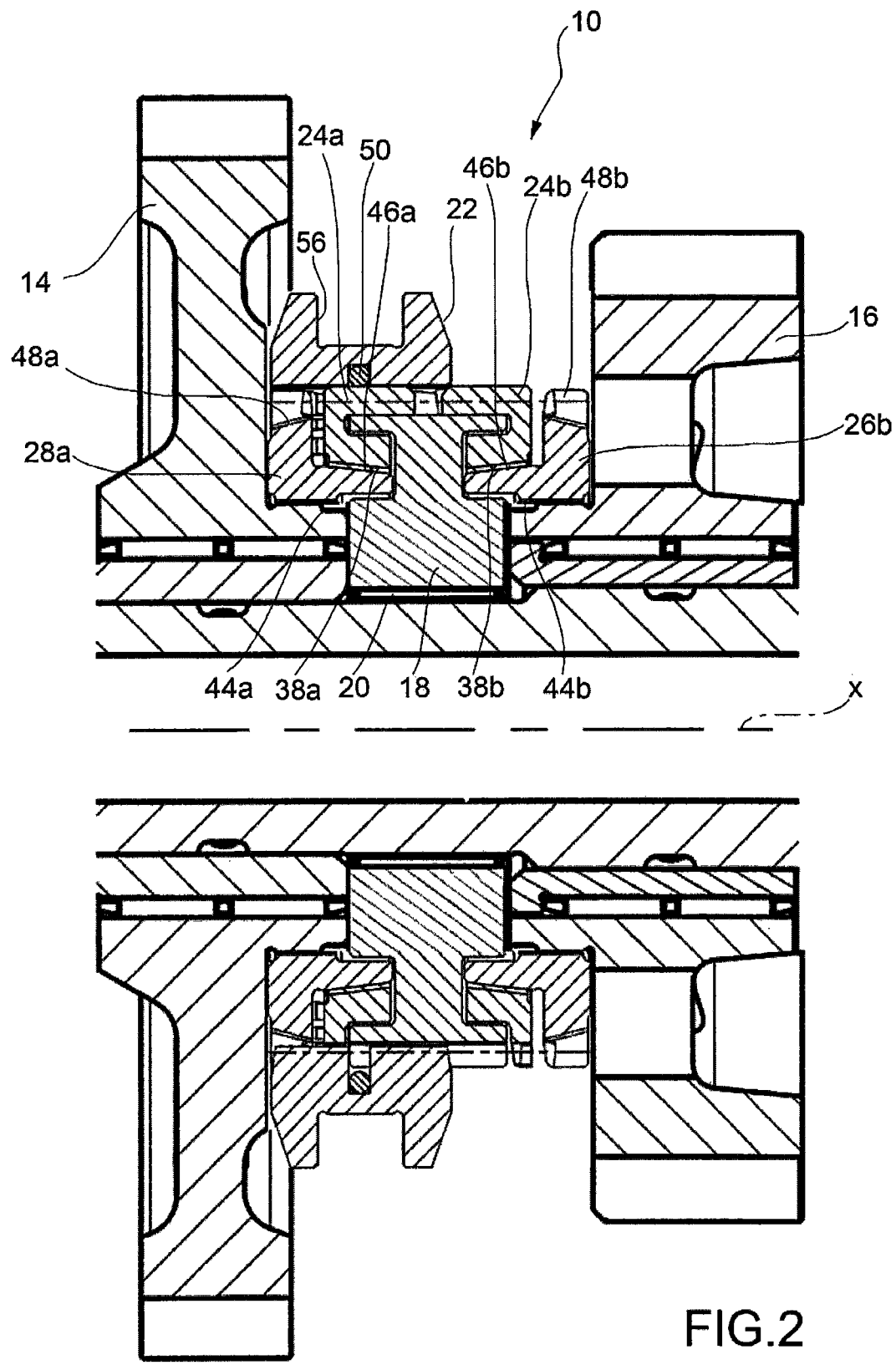
FIG. 2 is a section view of the synchronizer of FIG. 1, where the synchronizer is in one of its two engagement positions.

With reference first to FIGS. 1, 1a and 2, a synchronizer for a mechanical transmission, in particular to a vehicle transmission, according to an embodiment of the present invention is generally indicated at 10.

The synchronizer 10 is a so-called double synchronizer, i.e. a synchronizer which is designed to be mounted on a shaft 12 of the transmission between a pair of gear wheels 14 and 16 idly mounted on the shaft 12 and is arranged to selectively connect either of said gear wheels 14 and 16 for rotation with the shaft 12. The synchronizer 10 is movable, starting from a neutral position (shown in FIGS. 1 and 1a) where it does not connect either the gear wheel 14 or the gear wheel 16 for rotation with the shaft 12, into one or the other of two engagement positions in each of which it connects a respective one of said gear wheels 14 and 16 for rotation with the shaft 12.

Figure 3:
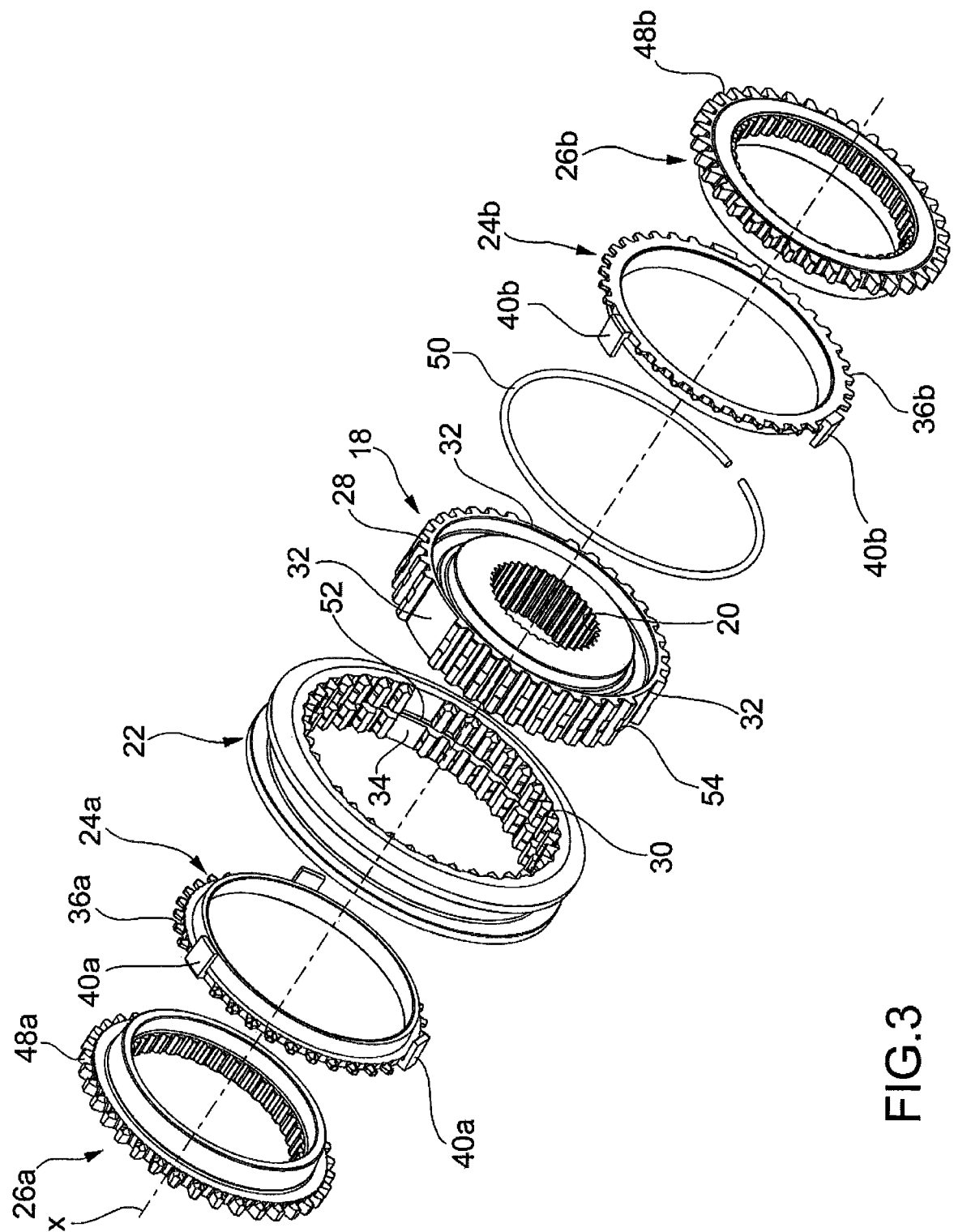
FIG. 3 is an exploded view of the synchronizer of FIG. 1.

With reference also to FIG. 3, the synchronizer 10 basically comprises:

- a hub 18 torsionally connected to the shaft 12, for example by splined coupling 20;
- an engagement sleeve 22 which is slidable in the axial direction (i.e. parallel to the longitudinal axis of the shaft 12, indicated at x in FIGS. 1 and 2) under control of a control member (not shown, but per-se-known type), for example a fork-like control member;
- a pair of synchronizing rings 24a and 24b associated to the gear wheel 14 and to the gear wheel 16, respectively;
- a pair of engagement ring gears 26a and 26b associate to the gear wheel 14 and to the gear wheel 16, respectively; and
- a pre-synchronizing system interposed between the hub 18 and the engagement sleeve 22.

The hub 18 is provided with outer teeth 28 meshing with inner teeth 30 of the engagement sleeve 22. The outer teeth 28 of the hub 18 and the inner teeth 30 of the engagement sleeve 22 are both cylindrical straight teeth, so as to allow axial sliding of the engagement sleeve 22 relative to the hub 18.

The outer teeth 28 of the hub 18 are interrupted by several non-toothed areas 32 which are angularly evenly spaced from each other, in particular three non-toothed areas 32 spaced by 120 degrees from each other.

Likewise, the inner teeth 30 of the engagement sleeve 22 are interrupted by a corresponding number of non-toothed areas 34 (only one of which is shown in FIG. 3) angularly evenly spaced from each other, in particular three non-toothed areas 34 spaced by 120 degrees from each other.

The synchronizing rings 24a and 24b are each provided with outer teeth, indicated at 36a for the synchronizing ring 24a and 36b for the synchronizing ring 24b. The outer teeth 36a and 36b of the synchronizing rings 24a and 24b mesh with the inner teeth 30 of the engagement sleeve 22 and are also made as cylindrical straight teeth.

Each of the synchronizing rings 24a and 24b has, on its radially inner side, a respective friction surface, in particular a conical surface, indicated at 38a for the synchronizing ring 24a and 38b for the synchronizing ring 24b. Each of the synchronizing rings 24a and 24b may however have more than one friction surface.

Moreover, each synchronizing ring 24a and 24b integrally forms a plurality of tabs, indicated at 40a and 40b, respectively, which extend axially inwards from the respective outer teeth 36a or 36b and are angularly evenly spaced from each other. The number of tabs 40a and 40b of each synchronizing ring 24a and 24b is equal to the number of the non-toothed areas 32 of the hub 18, that is to say, of the non-toothed areas 34 of the engagement sleeve 22 (this number being three, in the embodiment proposed herein). Each synchronizing ring 24a and 24b, along with the respective tabs 40a and 40b, may be obtained by different processes, for example starting from a sheet metal or by sintering).

Each tab 40a of the synchronizing ring 24a engages, along with a corresponding tab 40b of the synchronizing ring 24b, in a respective seat or recess formed in part by the non-toothed area 32 of the hub 18 and in part by the non-toothed area 34 of the engagement sleeve 22.

A given distance (indicated at D in FIG. 1a) is provided between the axially inner ends of the tabs 40a and 40b.

Furthermore, each tab 40a and 40b has, at its axially inner end and on its radially outer edge, a respective slanted surface or ramp, indicated at 42a for the synchronizing ring 24a and 42b for the synchronizing ring 24b.

The engagement ring gears 26a and 26b are connected, for example by splined coupling (indicated at 44a and 44b, respectively), with the gear wheels 14 and 16, respectively.

The engagement ring gear 26a has a friction surface 46a, in particular a conical surface, configured to cooperate with the friction surface 38a of the synchronizing ring 24a to allow the generation of a friction torque between the synchronizing ring 24a and the engagement ring gear 26a, and hence between the synchronizing ring 24a and the gear wheel 14. Likewise, the engagement ring gear 26b has a friction surface 46b, in particular a conical surface, configured to cooperate with the friction surface 38b of the synchronizing ring 24b to allow the generation of a friction torque between the synchronizing ring 24b and the engagement ring gear 26b, and hence between the synchronizing ring 24b and the gear wheel 16. Naturally, in case each of the synchronizing rings 24a and 24b has more than one friction surface, each of the engagement ring gears 26a and 26b will have a corresponding number of friction surfaces.

Moreover, the engagement ring gears 26a and 26b are provided with respective outer teeth 48a and 48b, which are made in particular as straight cylindrical teeth and are arranged to mesh with the inner teeth 30 of the engagement sleeve 22.

The pre-synchronizing system comprises a single elastic ring 50 axially interposed between the two synchronizing rings 24a and 24b and having a thickness smaller than the aforementioned distance D between the axially inner ends of the tabs 40a and 40b of the synchronizing rings 24a and 24b.

In the neutral position of the synchronizer 10, the elastic ring 50 is received in part in an internal annular groove 52 of the engagement sleeve 22 (shown in FIG. 1a) and in part in an external annular groove 54 of the hub 18 (shown in FIG. 3).

The internal annular groove 52 is formed in the inner teeth 30 and, preferably, has a depth substantially equal to the height of said teeth. Furthermore, the internal annular groove 52 has a depth equal to or larger than the thickness (radial size) of the elastic ring 50, so as to be able to wholly receive inside it said ring in the engagement positions of the synchronizer 10 (as shown in FIG. 2).

In the embodiment of FIGS. 1 to 3 the engagement sleeve 22 has a substantially U-shaped cross-section, with a middle portion 22' of reduced thickness and a pair of shoulders 22" extending radially outwards from the opposite axial ends of the middle portion 22' (as shown in FIG. 1a). A seat 56 is thus defined between the two shoulders 22", in which the control member engages in use to control the axial movement of the sleeve 22 in either direction. The internal annular groove 52 is formed in the middle portion 22' of the engagement sleeve 22, preferably at the centre of said portion.

The external annular groove 54 is formed in the outer teeth 28 of the hub 18 and has a depth significantly smaller than the height of said teeth, in such a manner as to allow the elastic ring 50 to disengage from said groove and be moved axially in either direction relative to the hub 18 when the synchronizer 10 is moved from the neutral position into either engagement position. In the neutral position, in which the elastic ring 50 is received in part in the external annular groove 54, there is therefore a certain radial play between the elastic ring 50 and the internal annular groove 52, which radial play allows the elastic ring 50 to elastically expand when the synchronizer 10 is moved into either engagement position.

With reference to FIGS. 1 and 2, operation of the synchronizer 10 will be described now, starting from the neutral position of FIG. 1, in which the engagement sleeve 22 is substantially at the same distance from the two engagement ring gears 26a and 26b, that is to say, in a substantially central position with respect to the hub 18. In this position, the internal annular groove 52 and the external annular groove 54 are substantially aligned with each other and define with each other an annular gap in which the elastic ring 50 is accommodated. Moreover, in this position the inner teeth 30 of the engagement sleeve 22 do not mesh either with the outer teeth 48a of the engagement ring gear 26a or with the outer teeth 48b of the engagement ring gear 26b.

Assuming that the synchronizer 10 has to connect the gear wheel 14 for rotation with the shaft 12 (but a similar reasoning applies in case the synchronizer 10 has to connect the other gear wheel 16 rotation with the shaft 12), the engagement sleeve 22 will be moved axially under control of the associated control member towards the engagement ring gear 26a. Since the elastic ring 50 is drivingly connected in the axial sliding movement with the engagement sleeve 22, as it is received in the internal annular groove 52 of the engagement sleeve 22, the elastic ring 50 will be urged against the synchronizing ring 24a, namely against the axially inner ends of the tabs 40a of said ring.

The friction surface 38a of the synchronizing ring 24a is thus brought into contact with the corresponding friction surface 46a of the engagement ring gear 26a to generate a pre-synchronizing torque allowing to bring the synchronizing ring 24a in phase with the engagement sleeve 22. Due to the engagement between the friction surfaces 38a and 46a of the synchronizing ring 24a and of the engagement ring gear 26a the synchronizing ring 24a rotates relative to the engagement sleeve 22 by such an angle that the outer teeth 36a of the synchronizing ring 24a prevent a further axial displacement of the engagement sleeve 22 towards the engagement ring gear 26a.

Once the angular speeds of the synchronizing ring 24a (i.e. of the hub 18 and of the engagement sleeve 22) and of the engagement ring gear 26a are equal to each other, i.e. the synchronizing ring 24a and the engagement ring gear 26a are synchronized, the engagement sleeve 22 may be moved axially further towards the engagement ring gear 26a to cause its inner teeth 30 to mesh with the outer teeth 48a of the engagement ring gear 26a. By virtue of this further axial movement of the engagement sleeve 22, the elastic ring 50 moves on the ramps 42a of the tabs 40a and then on the outer diameter of said tabs, thereby allowing the engagement sleeve 22 to complete the engagement process.

Figure 4:
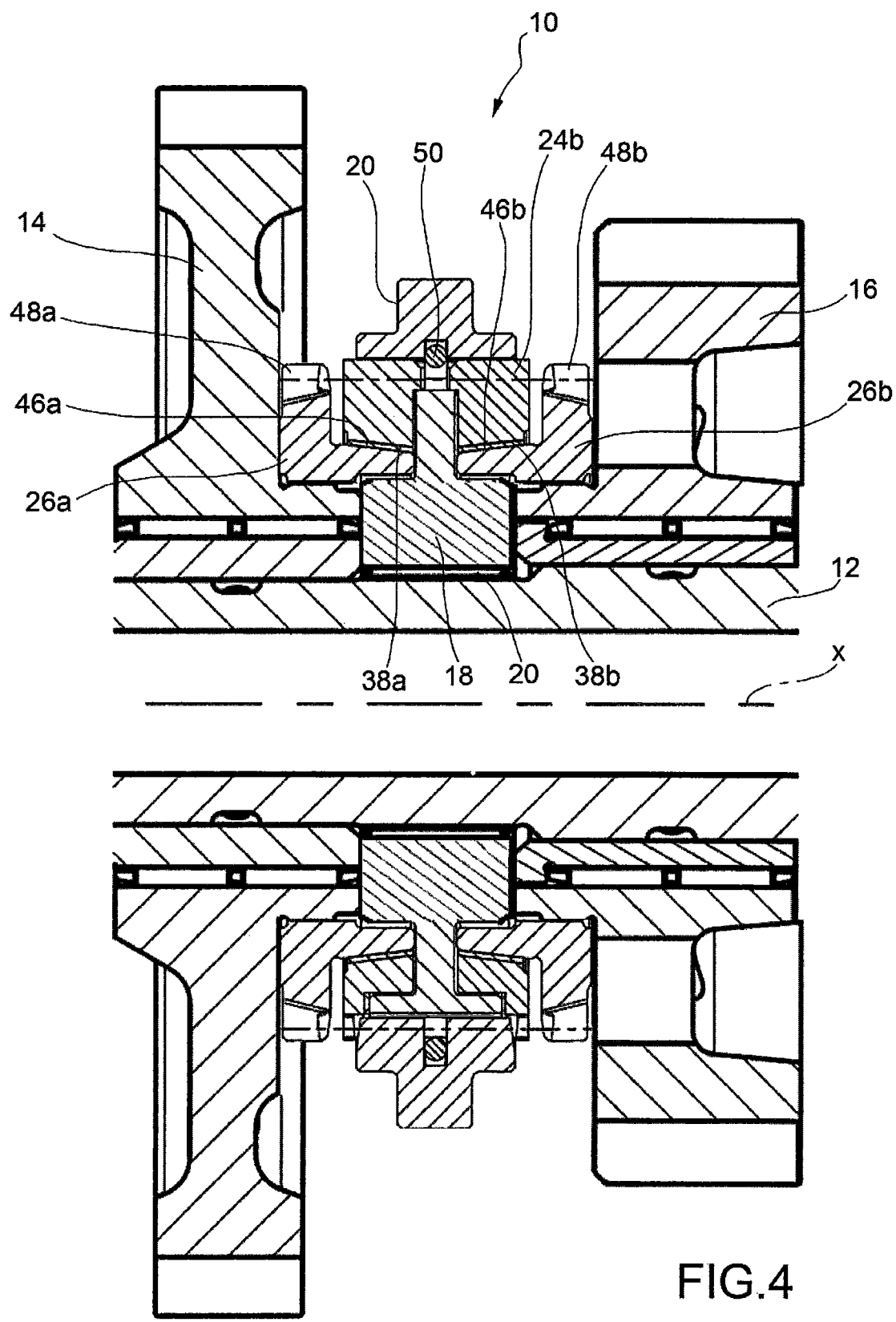
FIG. 4 is a section view of a synchronizer for a mechanical transmission according to a further embodiment of the present invention, in the neutral position.

A further embodiment of a synchronizer according to the present invention is shown in FIG. 4, where parts and elements identical or corresponding to those of FIGS. 1 to 3 have been given the same reference numerals.

This further embodiment differs from the one described above substantially only in the shape of the engagement sleeve 22, as in this case the engagement sleeve 22 has substantially T-shaped cross-section, with a larger thickness (i.e. a larger radial size) in the region of the internal annular groove 52. Clearly, this allows to make the engagement sleeve 22 even more strong than in the embodiment described above.

Naturally, the principle of the invention remaining unchanged, the embodiments and the constructional details may vary widely from those described and illustrated purely by way of non-limiting example, without thereby departing from the scope of the invention as defined in the appended claims.

What is claimed is:

1. A synchronizer for a mechanical transmission, the synchronizer being arranged to be mounted on a shaft of the transmission between a pair of gear wheels idly mounted on the shaft to selectively connect either of said gear wheels for rotation with the shaft and comprising a hub which is arranged to be torsionally connected to the shaft and is provided with outer teeth, an engagement sleeve which is provided with inner teeth meshing with the outer teeth of the hub and is slidably mounted relative to the hub in the direction of the longitudinal axis (x) of the shaft between a neutral position and a pair of engagement positions on opposite sides of the neutral position, a pair of engagement ring gears, each of which is arranged on a respective side of the hub and is provided with respective connecting means to be torsionally connected to a respective gear wheel, each engagement ring gear having at least one friction surface facing radially outwards and outer teeth for meshing with the inner teeth of the engagement sleeve when the engagement sleeve is in either of the engagement positions, a pair of synchronizing rings, each of which is arranged on a respective side of the hub to cooperate with a respective engagement ring gear, each synchronizing ring having at least one friction surface, which faces radially inwards and is arranged to cooperate with the respective friction surface of the associated engagement ring gear to generate a friction torque between the synchronizing ring and the respective engagement ring gear, and outer teeth meshing with the inner teeth of the engagement sleeve, and a pre-synchronizing system interposed between the hub and the engagement sleeve, the pre-synchronizing system comprising a single elastic ring which is axially interposed between the synchronizing rings, is drivingly connected with the engagement sleeve in the axial sliding movement relative to the hub and is at least partially received in an internal annular groove of the engagement sleeve, wherein each synchronizing ring integrally forms a plurality of tabs which extend axially inwards from the respective outer teeth and are angularly evenly spaced from each other, the plurality of tabs of each synchronizing ring being configured to allow the elastic ring to axially slide on said tabs when the engagement sleeve is moved from the neutral position to either of the engagement positions.

2. The synchronizer of claim 1, wherein said internal annular groove is provided in the inner teeth of the engagement sleeve.

3. The synchronizer of claim 1, wherein said internal annular groove has a depth substantially equal to the height of the inner teeth of the engagement sleeve.

4. The synchronizer of claim 1, wherein said internal annular groove has a depth equal to or larger than the radial thickness of the elastic ring.

5. The synchronizer of claim 1, wherein the hub has an external annular groove which in the neutral position of the synchronizer is aligned with said internal annular groove so as to define an annular seat in which the elastic ring is received.

* * * * *